(12) United States Patent
Roth et al.

(10) Patent No.: US 8,101,153 B2
(45) Date of Patent: Jan. 24, 2012

(54) METHOD FOR THE VALORISATION OF ZINC-AND SULPHATE-RICH RESIDUE

(75) Inventors: Jean-Luc Roth, Thionville (FR); Marie Bontemps, Luxembourg (LU)

(73) Assignee: Paul Wurth S.A., Luxembourg (LU)

( * ) Notice: Subject to any disclaimer, the term of this patent is extended or adjusted under 35 U.S.C. 154(b) by 8 days.

(21) Appl. No.: 12/601,622

(22) PCT Filed: May 6, 2008

(86) PCT No.: PCT/EP2008/055566
§ 371 (c)(1),
(2), (4) Date: Nov. 24, 2009

(87) PCT Pub. No.: WO2008/145490
PCT Pub. Date: Dec. 4, 2008

(65) Prior Publication Data
US 2010/0189637 A1    Jul. 29, 2010

(30) Foreign Application Priority Data
May 24, 2007  (EP) .................................... 07108864

(51) Int. Cl.
*C01G 9/02* (2006.01)
(52) U.S. Cl. .......................................... 423/622; 75/658
(58) Field of Classification Search .................. 423/622; 75/658
See application file for complete search history.

(56) References Cited

U.S. PATENT DOCUMENTS

| 4,072,503 A | 2/1978 | Petterson et al. |
| 4,415,540 A | 11/1983 | Wilkomirsky et al. |
| 7,597,740 B2 * | 10/2009 | Van Camp et al. ............. 75/483 |

FOREIGN PATENT DOCUMENTS

| FR | 2463189 A1 | 2/1981 |
| JP | 04147926 A * | 5/1992 |
| WO | 02068700 A1 | 9/2002 |
| WO | 2005005674 A1 | 1/2005 |

OTHER PUBLICATIONS

International Search Report PCT/EP2008/055566; Dated Jul. 1, 2008.
Lan Hong, et al., "Kinetics of carbothermic reduction of magnesia and zinc oxide by thermogravimetric analysis technique", Scandinavian Journal of Metallurgy 2003, 32, pp. 171-176.

(Continued)

*Primary Examiner* — Melvin Mayes
*Assistant Examiner* — Melissa Stalder
(74) *Attorney, Agent, or Firm* — Cantor Colburn LLP

(57) ABSTRACT

The present invention describes a method for treating residues comprising zinc ferrites and non-ferrous metals selected from among the group made up of lead (Pb), silver (Ag), indium (In), germanium (Ge) and gallium (Ga) or mixtures thereof in the form of oxides and sulfates, comprising the following steps:
 roasting of the residues in an oxidizing medium at elevated temperature in order to obtain a desulfurized residue,
 carburizing reduction/smelting of the desulfurized residue in a reducing medium,
 liquid phase extraction of carburized melt and slag,
 vapor phase extraction of the non-ferrous metals, followed by oxidation and recovery thereof in solid form.

14 Claims, 1 Drawing Sheet

OTHER PUBLICATIONS

Figure 1:
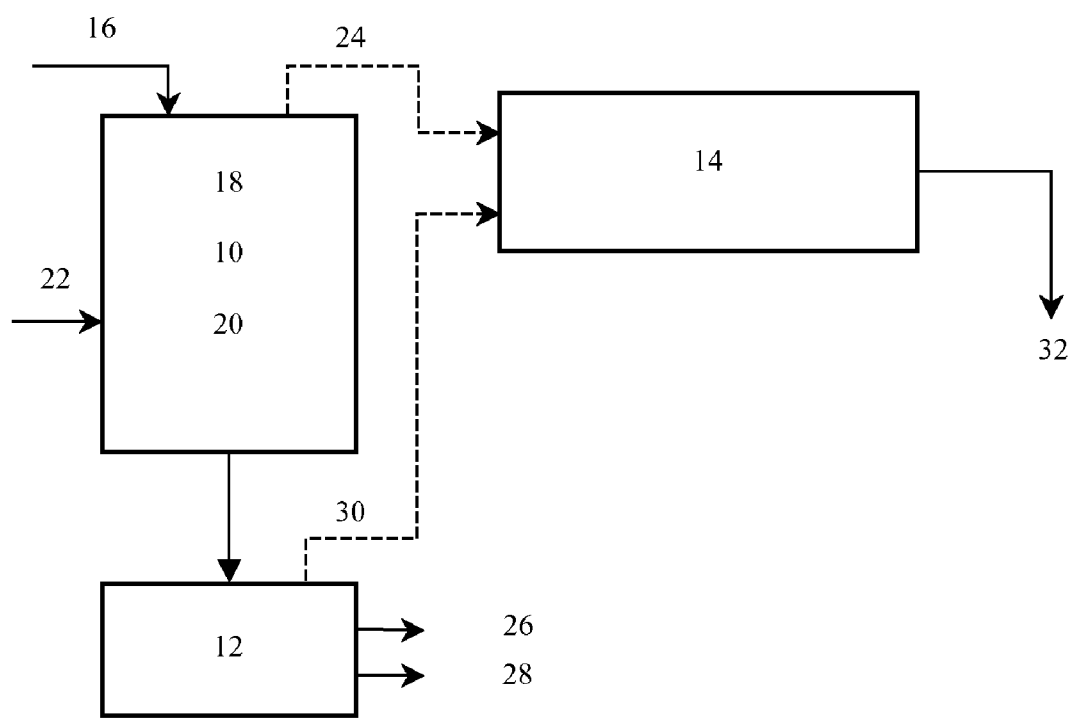

Nathalie LeClerc, et al., "Hydrometallurgical Extraction of zinc from zinc ferrites", online at www.sciencedirect.com, Hydrometallurgy 70 (2003) pp. 175-183.

R. Raghavan, "Hydrometallurgical processing of lead-bearing materials for the recovery of lead and silver as lead concentrate and lead metal", Hydrometallurgy, 58, (2000) pp. 102-116.

R. Raghavan, "Innovative processing technique to produce zinc concentrate from leach residue with simultaneous recovery of lead and silver", Hydrometallurgy 48 (1998) pp. 225-237.

M. Deniz Turan, et al., "Recovery of zinc and lead from zinc plant residue", online at www.sciencedirect.com, Hydrometallurgy 75 (2004) pp. 169-176.

Zhao Youcai, et al., "Technical Note Extraction of Zinc From Zinc Ferrites by Fusion with Caustica Soda", Minerals Engineering, vol. 13, pp. 1417-1421, 2000.

* cited by examiner

METHOD FOR THE VALORISATION OF ZINC- AND SULPHATE-RICH RESIDUE

TECHNICAL FIELD

The present invention relates to a method for recycling residues having an elevated content of zinc and sulfates. It relates more particularly to a method for processing residues arising from a neutral or weakly acidic leaching step during the hydrometallurgical extraction of zinc. These residues mainly comprise zinc ferrite ($ZnFe_2O_4$) and compounds in the form of sulfates.

BRIEF DISCUSSION OF RELATED ART

Extractive metallurgy for zinc involves subjecting sphalerite or blende, an impure ore containing zinc in the form of zinc sulfide (ZnS), to oxidising roasting at a temperature of between 910 and 980° C., the primary aim of which is to convert the sulfides into oxides. The resultant calcine mainly comprises zinc oxide (ZnO) and some compounds in the form of oxides and optionally of sulfates. In the subsequent leaching steps, the calcine is treated with a low-concentration sulfuric acid solution with the aim of extracting the zinc therefrom. The zinc extracted into the liquid phase is then subjected to a purification step before undergoing electrolysis.

The residue arising from the leaching operation still contains a significant quantity of complexed zinc, mainly in the form of insoluble zinc ferrites created during the roasting operation. This residue also contains metals such as silver (Ag), germanium (Ge), indium (In), etc.

In the conventional hydrometallurgical approach, dissolving the zinc ferrites in the residues arising from the leaching operation entails using concentrated and/or heated acidic solutions having an $H_2SO_4$ concentration of between 50 and 200 g/L. A method of this type is described in U.S. Pat. No. 4,415,540. A significant proportion of the complexed zinc can be recovered in this manner. However, decomplexing the ferrites brings about dissolution of the iron in the form of iron oxide together with many other impurities. The removal of iron is the aim of many hydrometallurgical methods, typical residues of which arising from the precipitation of iron by hydrolysis are haematite, goethite, paragoethite or jarosite. Due to the risk of leaching of the heavy metals present in these residues, it is not possible to avoid storing them in leak-proof, controlled areas. Increasingly stringent environmental requirements result in elevated storage costs, so calling the economic viability of these methods into question.

The method of U.S. Pat. No. 4,072,503 describes a pyrometallurgical method for treating residues created during the hydrometallurgical extraction of zinc. The material is firstly heated under non-reducing conditions with introduction of $O_2$ in order to break down the sulfides and sulfates. The desulfurised material containing the metal oxides is then reduced by addition of a reducing agent in a quantity such that the lead and zinc are reduced, but not the iron, which is eliminated in the slag. The reactors may be an elongate furnace with immersed electrodes or a rotary furnace.

A recent pyrometallurgical method (WO2005005674) proposes recovering non-ferrous metals such as Cu, Ag, Ge and Zn present in the residues originating from the hydrometallurgical extraction of zinc by a two-step method combining a multi-stage furnace and a submerged lance furnace. In the first reactor, the metal oxides present in the residues processed are pre-reduced with the assistance of coke. The fumes collected at the furnace outlet contain inter alia Pb and Zn. The pre-reduced material is then introduced into the second reactor, where it undergoes an oxidising smelting stage. During this step, the iron is eliminated with the slag in the form of FeO and $Fe_2O_3$. Copper and silver are extracted in the liquid phase. Finally, the collected fumes contain germanium together with the remainder of the zinc and lead still present in the product. This method makes it possible to recover a large proportion of the non-ferrous metals, but a very significant quantity of slag containing more than 30% Fe is produced: more than 650 kg per tonne of residues processed. However, this slag can only be recycled if it is stabilised and used in the construction sector. Recycling of the slag therefore directly depends on the demand for raw materials in this sector. Furthermore, high-temperature operation of the multi-stage furnace in a reducing environment results in a significant formation of accretions and clogging, resulting in very costly furnace maintenance and reduced availability of the facility.

Economic recycling of residues having an elevated content of iron and zinc, such as electric furnace dusts, is possible thanks to the PRIMUS® direct reduction method, based on the reduction smelting method described in WO2002/068700. Processing leaching residues by this method is associated with problems due to the elevated sulfur content. This is because the presence of such a quantity of sulfur inhibits the transfer of pre-reduced carbon into the cast iron. Furthermore, an elevated content of sulfur makes the cast iron unusable.

SUMMARY

The disclosure proposes an alternative solution to existing methods for treating residues having an elevated content of zinc and sulfates, in particular originating from the hydrometallurgical extraction of zinc.

This is achieved by a method for treating residues comprising zinc ferrites and non-ferrous metals selected from among the group made up of lead (Pb), silver (Ag), indium (In), germanium (Ge) and gallium (Ga) or mixtures thereof in the form of oxides and sulfates, comprising the following stages:
  a) roasting of the residues in an oxidising environment at elevated temperature in order to obtain a desulfurised residue,
  b) carburising reduction smelting of the desulfurised residue in a reducing environment,
  c) liquid phase extraction of carburised cast iron and slag,
  d) vapour phase extraction of the non-ferrous metals, followed by the oxidation and recovery thereof in the solid phase.

The residues used in the method advantageously originate from the hydrometallurgical extraction of zinc, in particular from a neutral or weakly acidic leaching step for zinc ores.

The three recoverable products arising from this method are therefore a carburised cast iron, a stable and inert slag usable for the manufacture of cement or as ballast and a mixture of oxides in pulverulent form containing non-ferrous metals such as zinc, lead, silver, indium and germanium, gallium (Zn, Pb, Ag, In, Ge, Ga).

The method has the advantage of enabling virtually complete recycling of the residues, including iron, so satisfying both environmental and economic requirements due to the recovery of non-ferrous metals, in particular zinc. In addition to the recovery of non-ferrous metals, the method makes it possible to recover the iron content in the residues in an economic manner while simultaneously reducing the quantity of slag formed. Furthermore, the slag obtained has a composition close to that of a blast furnace slag and may consequently be recycled in the same way.

Advantageously, a step a1) comprising carbon-based pre-reduction in the solid state of the iron oxides is inserted between step a) and step b). This pre-reduction in step a1) is preferably carried out at a temperature of between 800 and 900° C.

In accordance with another advantageous embodiment, the roasting of step a) and the pre-reduction of step a1) are carried out in a multi-stage furnace in which desulfurisation of the residues in an oxidising environment at elevated temperature (between 1000 and 1100° C.) is performed in the upper stages and the pre-reduction at low temperature in the lower stages. Using a multi-stage furnace enables thorough mixing of the compounds, so making desulfurisation effective at lower temperature with desulfurisation being appreciable from as low as 900° C. and almost complete at 1000° C. The literature cites distinctly higher temperatures for roasting sulfates in elongate furnaces.

The purpose of pre-reduction step a1) is to partially reduce the metal oxides, while minimising the reduction of zinc, which is performed in the smelting furnace. Pre-reduction in step a1) requires the addition of a carbon-containing reactant, preferably a coal with a high volatile content. The reduction in temperature from approximately 1000° C. to 1100° C. to below 900° C. is achieved by introducing the carbon-containing reducing agent. This carbon-containing reducing agent is not preheated before being introduced into the multi-stage furnace; its moisture content is preferably between 10 and 20%.

Carburising reduction smelting of the desulfurised residue in a reducing environment is preferably carried out in a plasma arc electric furnace. The heel is preferably vigorously stirred by injecting an inert gas (nitrogen, argon) through the furnace bottom, this being carried out for three reasons:

to equalise the temperature of the metal bath and the slag,
 to renew the surface of the slag layer in order to permit absorption of the treated material without the latter solidifying and forming an impenetrable crust,
 to increase entrainment extraction of non-ferrous metals in the gases.

The non-ferrous metals which may be extracted by the method are inter alia zinc, lead, silver, indium, germanium, gallium (Zn, Pb, Ag, In, Ge, Ga). If the residues contain copper, the majority of this is extracted in the liquid phase with the cast iron.

Silver is more difficult to extract due to its high vapour pressure. It is nevertheless possible to vaporise a large proportion of it by working at a higher temperature and by increasing the stirring flow rate for the cast iron bath. Typically, the temperature of a cast iron bath in an electric furnace is around 1,500° C. and the stirring flow rate between 80 and 120 L/min·t. If a temperature of above 1,550° C. with a stirring flow rate of between 100 and 300 L/min·t is used, the silver extraction yield is then greater than 90%.

DETAILED DESCRIPTION

According to a first preferred embodiment, the method according to the invention may be performed in two separate reactors. The first reactor is for example a conventional rotary furnace, where the residue is desulfurised. This desulfurised residue is then introduced with the anthracite which is necessary for reduction and carburisation into an electric furnace operated at a temperature of the order of 1,500° C. However, this approach would seem to be of little economic interest, on the one hand due to the significant quantity of fossil energy (gas/fuel oil) required for roasting and on the other hand due to the high cost of anthracite and likewise high electricity consumption.

One option for reducing costs involves replacing the anthracite with a lower cost reducing agent, specifically a coal with a high volatile content (>30%). "Steam coals" comprising 50 to 55% fixed C, 35 to 40% volatile compounds and 7 to 10% ash will typically be used.

In such a case, an intermediate step for devolatilising the coal and pre-reducing the iron oxides is then added. This step has two advantages over the first embodiment. On the one hand, pre-reduction of the iron oxides saves the electrical energy required to reduce them in the electric furnace. On the other hand, the heat arising from combustion of the excess gas produced by the carbon-containing reactant is utilised to meet the heat requirements for drying and desulfurising the material. Pre-reduction is carried out at a temperature of between 850° C. and 900° C. in order to achieve a degree of metallisation of the iron of from 20 to 40%. Coal is introduced in a quantity sufficient to provide an excess of free carbon necessary for complete reduction of the metal oxides in the electric furnace.

According to another preferred embodiment, the desulfurisation step and the pre-reduction step are carried out in two separate rotary furnaces in order to ensure better control of temperatures and the countercurrent reaction media. The volatile compounds and the hot gases of the pre-reduction reactor are used to heat the desulfurisation reactor. Air is injected to ensure combustion of the volatile compounds, postcombustion of the gases and oxidising conditions in the reaction environment.

Other characteristics and advantages will be revealed by the detailed description of an advantageous embodiment which is provided below by way of illustration with reference to the attached drawing, in which:

FIG. 1 is a schematic diagram of an installation which permits the implementation of the method according to the invention.

In this FIGURE, reference numeral 10 denotes a multi-stage furnace, reference numeral 12 an electric arc furnace and reference numeral 14 an installation for treating the fumes originating from both the multi-stage furnace and the electric furnace.

Before being introduced into multi-stage furnace 10 via the duct 16, the residues are preferably granulated or pelletised and pre-dried to facilitate handling.

The desulfurisation step a) proceeds in the upper stages 18. The lower stages 20 are dedicated to devolatilising the coal which is introduced via the duct 22 and to pre-reducing the iron oxides (step a1)). The volatile compounds and hot gases are used as an energy source in the upper stages 18, where the oxidising atmosphere is maintained by injecting excess air into the upper stages 18.

On leaving the multi-stage furnace 10, the solid product which has been desulfurised and pre-reduced, being at a temperature of approximately 800° C. to 900° C., is conveyed to the electric arc furnace 12.

It is possible for it to contain a small proportion of sulfur bound to calcium in the form of $CaSO_4$. However, this sulfur is not troublesome during production of the cast iron, because it is eliminated in the form of CaS with the slag.

The outlet gases from the multi-stage furnace 10 discharged via the duct 24 contain a relatively small quantity of dusts which were suspended during charging of the material into the reactor. The dusts are conveyed to the fume treatment installation 14 where they are mixed with the pulverulent oxides of step d).

This mode of operation of the furnace with high temperatures in the upper stages and low temperatures in the lower stages is original to the extent that it is the opposite of the usual mode of operation of a multi-stage furnace.

Stages b), c) and d) proceed simultaneously in the same reactor.

Step b) of the method is actually the combination of two phenomena:
- complete reduction of the metal oxides by a carbon-containing reducing agent,
- smelting of a metal bath vigorously stirred by addition of an inert gas, such as nitrogen ($N_2$) or argon (Ar).

The products resulting from this second step are a carburised cast iron (26), a slag (28) containing the main elements of the gangue and gases (30) mainly comprising carbon monoxide and carbon dioxide. These gases furthermore have a content of metallic compounds in vapour form. The collected gases join the same fume treatment line as the gases produced during step a).

The zinc and other metals are recovered in the form of a pulverulent product (32), made up of oxides and optionally sulfates when the compounds have recombined with the $SO_x$ produced during step a).

In a preferred embodiment, the method therefore involves two reactors. The first reactor is a multi-stage furnace in which the upper stages are dedicated to the desulfurisation of the product in an oxidising environment at elevated temperature and the lower stages to the pre-reduction of the iron at low temperature with the introduction of volatile coal at this level. The second reactor is a plasma arc electric furnace in which the final reduction and smelting stages proceed together with the extraction of non-ferrous metals.

Other distinctive features and characteristics of the invention will be revealed by the detailed description of an advantageous embodiment given below by way of illustration.

Example 1

Desulfurisation in an Oxidising Environment

An experimental study carried out in the laboratory demonstrated the feasibility of thermally decomposing the sulfated compounds from weakly acidic leaching. The analytical results are presented in Table 1.

Description of Test Installation

The test installation comprises a single-hearth laboratory furnace fitted with a gas treatment line. This furnace provides a batch simulation of the method of a continuous multi-hearth furnace, i.e. the progression of the continuous metallurgical phenomena. The laboratory furnace has an internal diameter of 500 mm. It is heated by means of electric heating elements located in the roof. On the central shaft there are mounted two diametrically opposed arms each supporting a pair of teeth oriented in opposing directions. Continuous stirring is thus ensured without any accumulation of material along the furnace wall. Gas injection through a duct into the furnace enclosure makes it possible to establish and maintain an atmosphere suited to the requirements of the test, this being achieved independently of the temperature setting. The gases formed during the oxidation/reduction reactions are collected in a postcombustion chamber, where any combustible compounds are burnt. The gases are subsequently cooled, then filtered, before being discharged into the atmosphere via a flue.

Description of Tests

Batch tests performed with 6.0 kg of leaching residues mainly made up of zinc ferrite ($ZnO.Fe_2O_3$), lead sulfate ($PbSO_4$), calcium sulfate ($CaSO_4$), zinc sulfate ($ZnSO_4$) and impurities such as $SiO_2$, $MgSO_4$, $Al_2O_3$, $CuSO_4$ were carried out in the enclosure described above. The material is granulated, then pre-dried to facilitate handling and transport. It is then introduced at ambient temperature into the furnace pre-heated to 1050° C. The oxidising atmosphere in the furnace enclosure is maintained by injecting air at a constant flow rate. A test lasts 60 minutes. The speed of rotation of the central shaft is a constant 3 rpm. Product temperature is measured regularly with the assistance of a thermocouple. In parallel with the measurement, a sample of the material is taken and then cooled with liquid nitrogen. The sample is finely ground, then analysed.

Results

The starting residue contains 5.01% S. Analyses reveal that 70% of the material is desulfurised in 15 min. After 60 min, the level of desulfurisation of the residue is 95%. The small quantity of S (0.24%) still present in the material is apparently bound to Ca in the form of $CaSO_4$. Thermal decomposition of the sulfates results in the release of $SO_3$ and $SO_2$, which are collected in the fume treatment line. These collected gases are mainly composed of $SO_N$, $H_2O$, $N_2$ and $O_2$.

The quantity of lead and zinc is identical before and after the tests, which allows the conclusion to be drawn that, at elevated temperature, in an oxidising environment, lead and zinc are not volatilised.

The aims of the first step are largely achieved with a desulfurisation rate of greater than 95% for a temperature of 1050° C. The limiting factor for treatment of the residue in the smelting furnace is a sulfur content of greater than 0.5%. The study has shown that temperature has a direct influence on the level of product desulfurisation. A person skilled in the art will straightforwardly be able to adjust the temperature and dwell time as a function of the intended degree of desulfurisation.

Example 2

Pre-Reduction of Iron Oxides

The experimental study was continued to demonstrate the feasibility of pre-reducing the iron oxides present in the acidic leaching residue. The reducing agent is a coal with a high volatile content containing 55% fixed carbon. The analytical results are presented in Table 1.

The test device is the same as described in Example 1.

The weakly acidic leaching residue which has been desulfurised in an oxidising atmosphere is kept in the laboratory furnace enclosure. 2.2 kg of wet coal are added and mixed into the material thanks to the continuous stirring. This quantity corresponds to a ratio of 300 kg per 1 t of residue. Air injection was previously stopped. The purpose of nitrogen injection at a constant flow rate is to prevent any introduction of interfering air so as to protect the reducing atmosphere. The water present in the coal is evaporated. The flame observed in the postcombustion chamber is due to the combustion of the carbon monoxide produced on reduction of the iron oxides. A test lasts one hour, during which the temperature of the material is regularly measured. Again using the operating method described in Example 1, samples are taken in parallel with these measurements and then analysed.

Results

The iron oxides present in the residue are partially reduced. The iron phases present in the pre-reduced material are wustite (FeO) and metallic iron (Fe). The gas mixture collected in the fume treatment line is mainly composed of $H_2O$, CO, $CO_2$, $N_2$ and $O_2$. The proportions of each gas vary as a function of the kinetics of the reactions involved.

At 1,000° C., the level of metallisation is greater than 90%. Experience shows, however, that it is frequently preferable to operate at 900° C. This is because very rapid metallisation of iron at the surface results in the granules sticking together in "bunches". At 900° C., the level of metallisation is less than 75%, but remains satisfactory to ensure the economic viability of an industrial installation.

It should be noted that coal is an additional source of sulfur, which explains the larger quantity of sulfur in the pre-reduced material than in the desulfurised residue. However, this quantity is low and has no impact on yield nor on the quality of the finished products.

Example 3

Final Reduction and Smelting

This example describes a reduction smelting test of the pre-reduced material, a weakly acidic leaching residue which has previously been dried and desulfurised. The products leaving the smelting furnace are a carburised cast iron containing copper, an inert slag composed of the main constituents of the gangue and the fumes containing numerous metals in the form of gas or dust. Oxidation, cooling and filtration of these compounds proceed in the fume treatment line.

Description of Test Installation and Smelting Method

The installation is an electric arc furnace equipped with a gas treatment line comparable to that in the first furnace. The furnace has a diameter of 2.5 m and can contain 6 t of cast iron. The material is gravity charged, at a constant flow rate, into the central zone of the furnace. The arc makes it possible to heat the bath to the desired temperature. The smelting carried out is of the PRIMUS® type with a bath strongly stirred by pneumatic gas injection ($N_2$). The slag is discharged via a door provided for this purpose, the cast iron via the taphole. The dust-laden gases are collected in the fume treatment line. A postcombustion chamber converts the CO into $CO_2$ and combusts other combustible compounds and cools the gases by adding excess air. Before being released into the atmosphere, the gases pass through a bag filter where dusts are recovered.

Description of Test

The purpose of the test is to determine the distribution coefficient of the various elements, in particular of the recoverable metallic elements such as Zn, Pb, Ag, Ge, by analysis of the cast iron, the slag and the dusts produced.

The desulfurised and partially reduced weakly acidic leaching residue is introduced at a constant flow rate into the electric furnace containing a cast iron bath necessary for formation of the electric arc. The bath is maintained at a temperature of 1,500° C. for several hours. Continuous measurement of the carbon content makes it possible to monitor that the test is proceeding properly from the standpoint of the method. A sample is taken every half an hour with the assistance of a manipulator. The material sampled is then analysed. The basicity of the slag is adjusted with an additive to ensure good fluidity.

Results

The cast iron obtained is composed of 93.5% Fe, 4% C, 2.5% Cu and a few traces of other elements.

The slag contains the principal elements of the gangue: essentially $SiO_2$, CaO, $Al_2O_3$, MgO, MnO, S.

The oxides of recyclable metals Zn, Pb, Ag, Ge, are recovered in the dusts collected in the fume treatment line filter.

Example 4

Mass Balance

On the basis of the experimental studies described in Examples 1, 2 and 3, the mass balance was calculated for the complete treatment method for a weakly acidic leaching residue.

TABLE 1

Mass balance of the desulfurisation/reduction/smelting method

| | Mass [g] | Fe | Zn | Pb | Cu | C | S | Ag | In | Ge | Gangue | Other |
|---|---|---|---|---|---|---|---|---|---|---|---|---|
| Materials input into furnace | | | | | | | | | | | | |
| Dry weakly acidic leaching residue | 6,000 | 28.2 | 22.6 | 4.9 | 0.8 | 0.5 | 5.6 | 0.045 | 0.004 | 0.0075 | 18.5 | 18.8 |
| Coal | 2,000 | | | | | 55.0 | 0.7 | | | | 4.5 | 39.8 |
| Materials input into smelting furnace | | | | | | | | | | | | |
| Desulfurised and pre-reduced residue | 5,106 | 32.5 | 26.0 | 5.6 | 0.9 | 8.9 | 0.6 | 0.052 | 0.005 | 0.009 | 23.1 | 2.2 |
| CaO | 900 | | | | | | | | | | 100.0 | |
| Materials output from smelting furnace | | | | | | | | | | | | |
| Melt | 1,648 | 93.5 | <0.01 | <0.01 | 2.49 | 4.0 | 0.05 | 0.016 | <0.001 | 0.001 | <0.1 | <0.1 |
| Slag | 2,183 | 4.0 | <0.5 | <0.3 | <0.1 | | <0.5 | 1.3 | | | 93.3 | |

TABLE 1-continued

Mass balance of the desulfurisation/reduction/smelting method

| | Mass [g] | Element [mass %] | | | | | | | | | | |
|---|---|---|---|---|---|---|---|---|---|---|---|---|
| | | Fe | Zn | Pb | Cu | C | S | Ag | In | Ge | Gangue | Other |
| ZnO concentrate | 2,503 | 2.7 | 53.6 | 11.5 | 0.2 | <0.5 | 12.8 | 0.1 | 0.0095 | 0.017 | 2.5 | 16.1 |

The recovery rate of Ag is greater than 90%; that for Zn, Pb, In and Ge is greater than 95%.

The invention claimed is:

1. A method for treating residues comprising zinc ferrites and non-ferrous metals selected from among the group made up of lead (Pb), silver (Ag), indium (In), germanium (Ge) and gallium (Ga) and mixtures thereof in the form of oxides and sulfates, comprising the following steps:
    a. roasting of the residues in an oxidising medium at elevated temperature in order to obtain a desulfurised residue,
    b. smelting of the desulfurised residue in a reducing environment,
    c. liquid phase extraction of carburised cast iron and slag from the smelted desulfurised residue,
    d. vapour phase extraction of the non-ferrous metals from the smelted desulfurised residue, followed by oxidation and recovery thereof in solid form.

2. A method according to claim 1, wherein the roasting of step a) is performed at temperatures of between 1000° C. and 1100° C.

3. A method according to claim 1, wherein the residual sulfur content of the desulfurised residue must not exceed 0.5% of the total mass of the residue.

4. A method according to claim 1, wherein, between step a) and step b), there is inserted a step a1) comprising carbon-based pre-reduction of the desulfurized residue in a solid state.

5. A method according to claim 4, wherein the pre-reduction in step a1) is carried out at temperatures of around 900° C.

6. A method according to claim 4, wherein the roasting of step a) and the pre-reduction of step a1) are performed in a multi-stage furnace in which step a) is performed in the upper stages and step a1) is performed in the lower stages.

7. A method according to claim 6, wherein step a1) is performed in the lower stages with introduction of coal at this level.

8. A method according to claim 1, wherein the smelting of the desulfurised residue in the reducing environment is performed in a smelting bath of an electric arc furnace.

9. A method according to claim 8, wherein the bath of carburised iron at 1500° C. is stirred with a nitrogen or argon flow rate of between 50 and 100 L/min·t.

10. A method according to claim 1, wherein the residues comprising zinc ferrites and non-ferrous metals selected from among the group made up of lead (Pb), silver (Ag), indium (In), germanium (Ge) and gallium (Ga) and mixtures thereof in the form of oxides and sulfates are residues originating from the hydrometallurgical extraction of zinc.

11. A method according to claim 8, wherein the temperature of the smelting bath is greater than 1550° C. and the stirring flow rate is between 100 and 300 L/min·t in order to increase the precious metal extraction yield.

12. A method according to claim 2, wherein the residual sulfur content of the desulfurised residue must not exceed 0.5% of the total mass of the residue.

13. A method according to claim 2, wherein the smelting of the desulfurised residue in the reducing environment is performed in an electric arc furnace.

14. A method according to claim 2, wherein the residues comprising zinc ferrites and non-ferrous metals selected from among the group made up of lead (Pb), silver (Ag), indium (In), germanium (Ge) and gallium (Ga) and mixtures thereof in the form of oxides and sulfates are residues originating from the hydrometallurgical extraction of zinc.

* * * * *